(12) United States Patent
Ramanujam (10) Patent No.: US 8,478,721 B2
(45) Date of Patent: Jul. 2, 2013

(54) SYNCHRONIZATION OF RECURRING TIME-SCHEDULED DATA OBJECTS BETWEEN INCOMPATIBLE DATABASES

(75) Inventor: Srinivasan Ramanujam, Meridian, CA (US)

(73) Assignee: Sybase, Inc., Dublin, CA (US)

( * ) Notice: Subject to any disclaimer, the term of this patent is extended or adjusted under 35 U.S.C. 154(b) by 178 days.

(21) Appl. No.: 12/709,919

(22) Filed: Feb. 22, 2010

(65) Prior Publication Data

US 2011/0208697 A1 Aug. 25, 2011

(51) Int. Cl.
*G06F 17/30* (2006.01)
(52) U.S. Cl.
USPC .................. 707/621; 707/951; 705/7.18
(58) Field of Classification Search
USPC ...... 707/695, 756, 621, 951; 705/7.12; 711/1; 368/29
See application file for complete search history.

(56) References Cited

U.S. PATENT DOCUMENTS

| 5,893,073 A * | 4/1999 | Kasso et al. ................. 705/7.12 |
| 7,349,920 B1 * | 3/2008 | Feinberg et al. ...................... 1/1 |
| 7,440,961 B1 * | 10/2008 | Matousek ............................. 1/1 |
| 7,492,670 B2 * | 2/2009 | Parees et al. ..................... 368/29 |
| 7,711,717 B2 * | 5/2010 | Gupta et al. .................. 707/695 |
| 2003/0061433 A1 * | 3/2003 | Hall et al. .......................... 711/1 |
| 2008/0235072 A1 * | 9/2008 | Gupta et al. ....................... 705/9 |

* cited by examiner

*Primary Examiner* — Albert Phillips, III
(74) *Attorney, Agent, or Firm* — Sterne, Kessler, Goldstein & Fox PLLC (57) ABSTRACT

Methods, apparatus and computer program products for storing a recurring time-scheduled data record in a calendaring application that does not support a pattern of recurrence of the record are described herein. The method includes the steps of: 1) receiving from a server, the recurring time-scheduled data record having a first recurrence pattern; 2) determining whether the first recurrence pattern is supported by the calendaring application; 3) if the pattern is not supported, then selecting a closest recurrence pattern supported by the calendaring application; 4) modifying the selected closest recurrence pattern by applying recurrence exceptions to create a second recurrence pattern; 5) modifying the recurring time-scheduled data record based on the second recurrence pattern to create a supported record; and 6) transferring the supported record to the calendaring application.

19 Claims, 10 Drawing Sheets

| Sunday | Monday | Tuesday | Wednesday | Thursday | Friday | Saturday |
|---|---|---|---|---|---|---|
| January 3 | 4 | 5 | 6 | 7 | 8 | 9 |
| 311 | 312 Pattern 341 Exceptions 342 | 313 | 314 | 315 | 316 | 317 |

310

←——— 318 ———→   ←— 319 —→

| Sunday | Monday | Tuesday | Wednesday | Thursday | Friday | Saturday |
|---|---|---|---|---|---|---|
| January 3 | 4 | 5 | 6 | 7 | 8 | 9 |
| 711 Pattern 741 Exceptions 742 | 712 | 713 | 714 | 715 | 716 | 717 |

SYNCHRONIZATION OF RECURRING TIME-SCHEDULED DATA OBJECTS BETWEEN INCOMPATIBLE DATABASES

FIELD OF THE INVENTION

The present invention relates generally to database systems and, more particularly, to the synchronization of data between databases.

BACKGROUND

Modern computer networks have lead to an increased use of distributed systems. To facilitate different applications, distributed systems may rely upon exchanges of data between distributed parts. One type of data exchanged between systems is a data object representing an event that is scheduled to occur at a particular time. While these time-scheduled data objects may be scheduled only to occur once, very frequently time-scheduled data objects are scheduled to reoccur at a particular frequency. A data object that corresponds to a birthday for example, will reoccur yearly on a particular date.

Frequently, when recurring data objects are exchanged between different systems, especially when the systems have disproportionate processing capabilities, e.g., computer servers and mobile devices, incompatibilities may arise that can complicate the exchange.

Therefore, systems, methods and computer program products are needed that overcome the limitations of the conventional approaches for synchronizing time-scheduled recurring data objects between systems.

BRIEF SUMMARY

Embodiments described herein include a method of storing a recurring time-scheduled data record in a calendaring application that does not support a pattern of recurrence of the record. The method begins by receiving from a server, the recurring time-scheduled data record having a first recurrence pattern. A determination is made as to whether the first recurrence pattern is supported by the calendaring application, and if the pattern is not supported, a closest recurrence pattern supported by the calendaring application is selected. The selected closest recurrence pattern is modified by applying recurrence exceptions to create a second recurrence pattern. The recurring time-scheduled data record is modified based on the second recurrence pattern to create a supported record. The method completes by transferring the supported record to the calendaring application.

Another embodiment includes a computer-implemented synchronizer for storing a recurring time-scheduled data record in an application that does not support the pattern of recurrence of the record. The synchronizer includes an event analyzer module configured to receive a recurring time-scheduled data record from a server, and determine whether the data record is supported by a calendaring application. A pattern selector module is configured to select a pattern supported by the calendaring application that is similar to the pattern of the received data record. A conversion module is configured to then apply exceptions to the selected supported pattern, and then convert the data record into a record having the selected supported pattern. A synchronizer module is configured to then transfer the supported record to the calendaring application.

Further embodiments, features, and advantages of the invention, as well as the structure and operation of various embodiments of the invention are described in detail below with reference to accompanying drawings.

BRIEF DESCRIPTION OF THE FIGURES

Embodiments of the invention are described with reference to the accompanying drawings. In the drawings generally, like reference numbers may indicate identical or functionally similar elements. The drawing in which an element first appears is generally indicated by the left-most digit in the corresponding reference number.

The features and advantages of the present invention will become more apparent from the detailed description set forth below when taken in conjunction with the drawings.

DETAILED DESCRIPTION

While embodiments are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe the synchronization of recurring time-scheduled data objects between incompatible databases and/or systems in further detail.

Overview

Embodiments of the invention provide a mechanism that improves the transfer of event information from one calendaring system to another calendaring system. This transfer of information as used herein, may be a one way transfer, or a two-way exchange or synchronization, and all these terms are used interchangeably. Complex events often are not effectively exchanged between systems because of unsupported features or other incompatibilities. The synchronization methodology used herein allows systems to reduce incompatibilities between systems, and improve the experience of system users.

As used herein, according to embodiments, a "time-scheduled data object" may be any data object that is specifically related to a specific time, e.g., an event, calendar entry or calendar object. This type of data object is commonly used to represent appointments, meetings, anniversaries, and day events. A time scheduled data object is often displayed on a calendar user interface, and accessed, stored and managed in a calendaring system, e.g., a calendar server application, calendar application or calendar data source. Example calendar server applications include MICROSOFT EXCHANGE SERVER provided by Microsoft Corp. of Redmond, Wash. and LOTUS DOMINO provided by IBM Corp. of Armonk, N.Y. However, the inventions described herein is not limited to calendar applications.

While discussed generally herein as a calendar entry, a data object may be a textual, audio, graphical, video, written or and other object encoded in digital form and encapsulated in a computer readable structure, such as a file, message, computer readable medium, or shared memory object, that a software application program can access and manipulate. Unless specifically stated differently, a data object is interchangeably used herein to identify an email message, application data, a web services request, a method call, a database record, a data store record, communications data or other like items known to persons having skill in the art.

Unless specifically stated to the contrary, according to embodiments, a "user" is interchangeably used herein to identify a human user, a software agent, or a group of users and/or software agents. Besides a human user who needs to synchronize email, data, and calendar or other time based entries, a software application or agent sometime needs to synchronize these items. Accordingly, unless specifically stated, the term "user" as used herein does not necessarily refer to a human being.

Architecture

Figure 1:
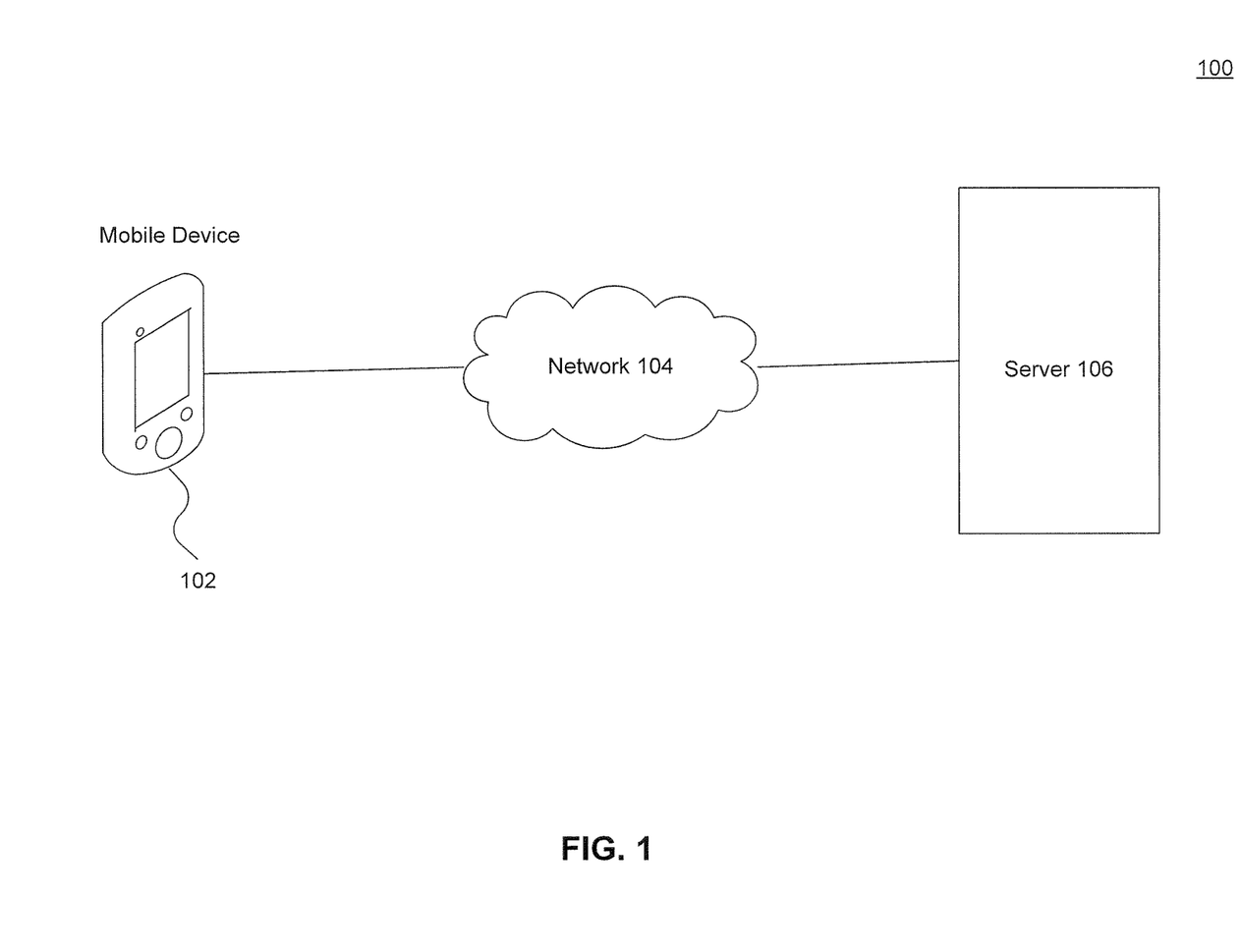
FIG. 1 depicts a network architecture according to an embodiment of the invention.

FIG. 1 is an example network architecture 100 in which embodiments of the present invention, or portions thereof, are implemented. Network architecture 100 includes a mobile device 102 connected over a network 104 to a server 106, in accordance with an embodiment of the present invention. While the embodiment of the invention depicted on FIG. 1 shows mobile device 102 and server 106, it is important to note that embodiments can be used to exchange data between any type of computer-implemented calendaring data sources and systems.

In an embodiment, mobile device 102 includes one of many devices commonly designated as mobile clients, such as, but not limited to, personal digital assistants ("PDAs"), devices operating according to the Microsoft Pocket PC specification with the Microsoft Windows® CE operating system (OS), devices running the Symbian OS, devices running the Palm OS®, mobile phones, BlackBerry® devices, smart phones, hand held computers, palmtop computers, laptop computers, ultra-mobile PCs, and other wireless mobile devices capable of running mobile applications. In an embodiment, mobile device 102 may be 'online' or connected to server 106. In another embodiment, mobile device 102 can be 'offline' or not connected to server 106. In yet another embodiment, mobile device 102 can be intermittently connected to server 106.

In an embodiment, mobile device 102 includes, but is not limited to, a device having one or more processors and memory for executing and storing instructions. The mobile device 102 may include software, firmware, and hardware or some combination thereof. The software may include one or more applications and an operating system. The hardware can include, but is not limited to, one or more processors, memory and user interface display. In an embodiment, mobile device 102 includes a client application that receives data from server 106.

Although FIG. 1 illustrates a single mobile device 102 for clarity, it is to be appreciated that system 100 is scalable and a plurality of mobile device 102 can connect to server 106 via network 104. Also, system 100 may include multiple servers 106. In an embodiment, network 104 includes one or more networks, including but not limited to, a local area network, medium-area network, and/or wide-area network, such as, the Internet. Network 104, for example, can be a wired or wireless network or combinations thereof that allow mobile device 102 and server 106 to communicate with each other. In embodiments, network 104 can further support world-wide web protocols and services.

Figure 2:
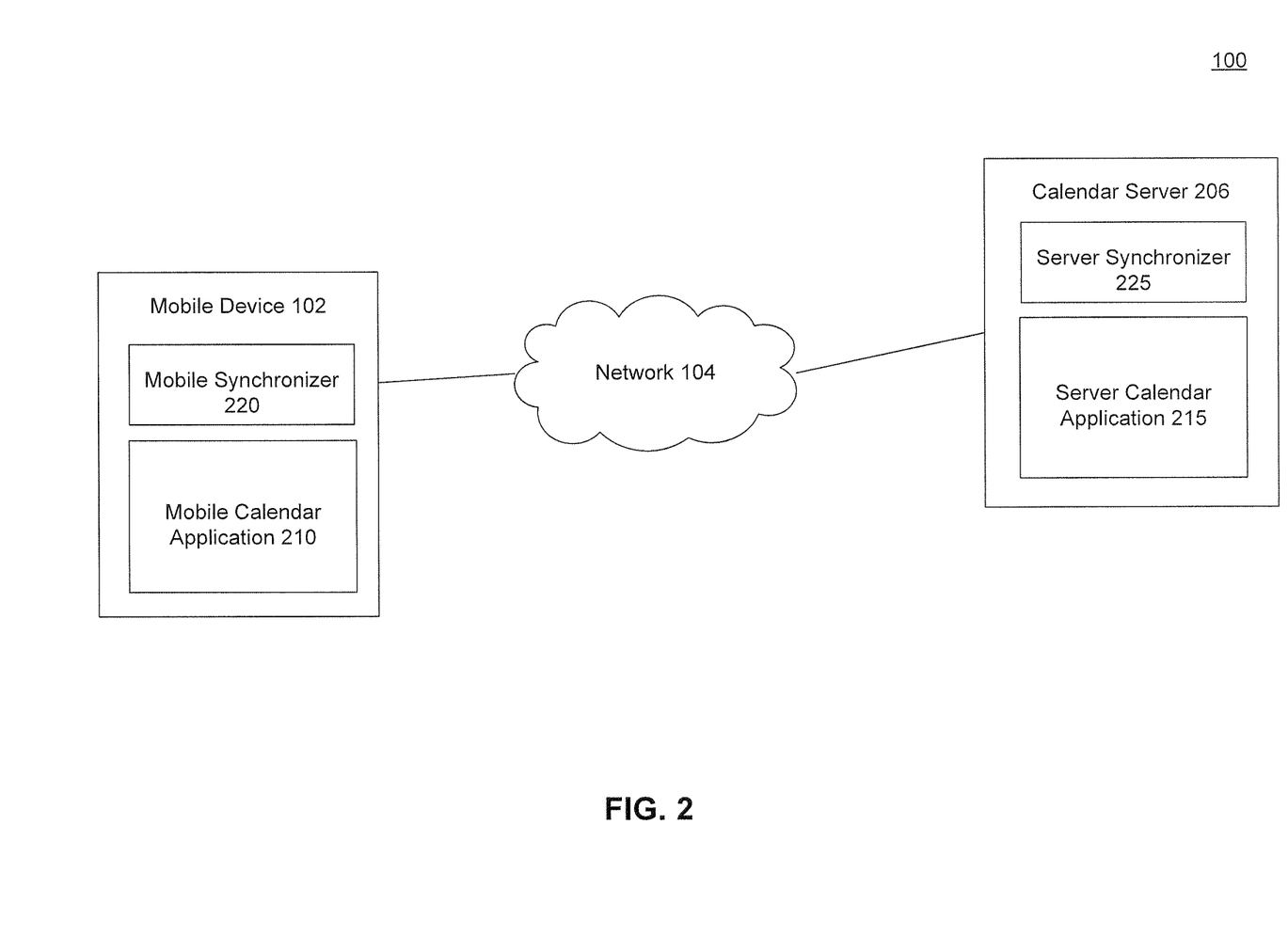
FIG. 2 depicts calendaring applications according to an embodiment of the invention.

FIG. 2 shows a detailed view of mobile device 102 connected to calendar server 206, the calendar server being a type, or representing some functional aspects, of server 106. Mobile device 102 contains a mobile synchronizer 220 and a mobile calendar application 210. Calendar server 206 contains server synchronizer 225 and server calendar application 215.

An application is any software program or web service that can be executed or run on a server 106 or mobile device 102. An application may include at least a rendering component, execution logic, and Input/Output (I/O) parameters. An application's execution logic may be in the form of binary executable code or scripting programming/markup languages such as HyperText Markup Language (HTML), Extensible HTML (XHTML), Java, JavaScript, or AJAX (Asynchronous JavaScript and XML). One of skill in the relevant arts will appreciate that other programming languages and technologies can be used for an application's execution logic. In accordance with an embodiment, mobile synchronizer 220 and mobile calendar application 210 are applications configured to operate on mobile device 102, and server synchronizer 225 and server calendar application 215 are applications configured to operate on calendar server 206.

In an embodiment, mobile device 102 and calendar server 206 synchronize their event information at periodic intervals. Difficulties may arise when seeking to maintain the 'same version' of data on different systems. Different capabilities on the synchronized systems may cause the data versions designed to be processed and stored on each to not be compatible with each other. In addition, because often the maker of mobile calendar application 210 is not the same as the maker of server calendar application 215, no coordinated or compatible versions of data items may be developed.

Recurring Events

Figure 3:
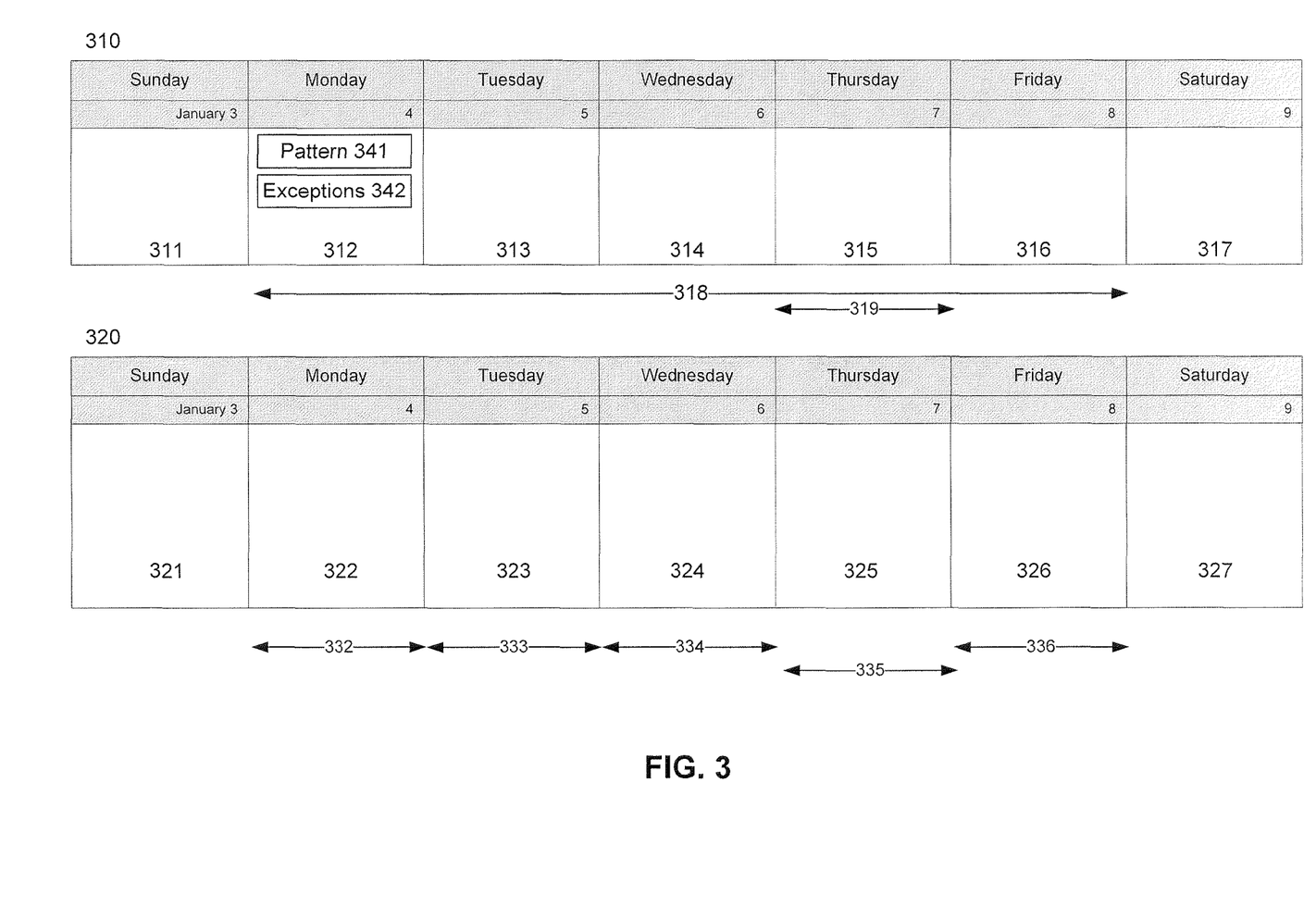
FIG. 3 depicts example calendars according to an embodiment of the invention.

FIG. 3A depicts a type of time-scheduled data object that is of a higher level of complexity than standard, appointment-type single time interval events. A recurring or repeating event is scheduled to occur more than once over a specified interval, such as weekly, monthly, daily, etc. Examples include: "every weekday for 10 occurrences," "every second Monday of the month," "every other Wednesday, for an indefinite duration." Other examples are discussed with embodiments described herein.

On Calendar 310, event 318 and exception 319 represent a recurring event. Event 318 is shown as a full day event, occurring every weekday starting on day 312. In the art, recurring events may be stored as time-scheduled data objects in several ways. A first way is to have a single data object with certain defining attributes. A pattern 341 is used to define the broad pattern and bounds of an event, and the exceptions list 342 is used to provide narrow exceptions or exclusions to the event's occurrence. In calendar 310, in an example, the recurring event shown thereon is "every weekday except Thursday, until Jun. 5, 2010."

In this example, day 312 contains a recurring event with two attributes. Pattern 341 defines the recurrence of the event along with its bounds, or termination. For example, in a recurring event scheduled to occur "every Monday until Jun.

5, 2010," the pattern is "every Monday" and the bounds are "until Jun. 5, 2010." Similarly, in a recurring event scheduled to occur "every weekday for 10 occurrences," the pattern is "every weekday" and the bounds are "for 10 occurrences." Examples of types of bounds include: "bounded by count," e.g., ten occurrences, "bounded by date," e.g., until May 4, 2010 and "unbounded."

A second defining attribute, used to define a recurring event is the exceptions 342. In the recurring event "every weekday until Jun. 5, 2010, except May 4, 2010," the limitation "except May 4, 2010" is a "deleted exception" to the pattern. The term deleted exception refers to the concept that certain time periods are "deleted" from the broad pattern 341.

Another type of exception is called a "modified exception." In the event "every Weekday from 10 AM-12 PM until Jun. 5, 2010, except for May 4, 2010 where the appointment occurs from 1 PM-2 PM," the limitation "except for May 4, 2010 where the appointment occurs from 1 PM-2 PM" is a modified exception to the broad, bounded pattern 341. In this case therefore, in calendar 310, pattern 341 would define event 318, and exception 319 would be removed.

The alternative to using the recurring appointment structure described above is to enter each recurrence of an appointment as a separate appointment in a calendar. For example, calendar 320 depicts events 332-334 and 336. The calendar 320 example of individual appointments is the equivalent of calendar 310 described above. It is worthy of note that, assuming the size of each event on calendars 310, 320 are the same, the four calendar 320 events 332-334, 336 require more storage space than the single stored recurring event on day 312 in calendar 310. Assuming also, that it requires more processing for a server to interpret pattern 341 and exceptions 342 for the day 312 recurring event, the calendar 310 appointment requires more processing on a server than individual stored appointments 332-334 and 336 stored on calendar 320.

Calendaring solutions that implement recurring appointments offer a broad array of different types of patterns, boundaries and exceptions. Complex recurring patterns include: every weekday, every other week on a Monday, every second Friday of a Month, the first day of every month, etc. One example list of different types of recurring events is the ICALENDAR specification provided by the Internet Calendaring and Scheduling Core Object Specification.

Conventional Synchronization of Incompatible Recurring Events

As discussed above, because of the complexity involved, and because of software or hardware limitations, not all calendaring systems support all types of recurring events. Different systems also may use different internal data structures for storing and presenting recurring time-scheduled data objects, e.g., even if two systems support the same type of recurring event, the event may not be implemented in the same fashion on both systems and thus not be directly transferable. This incompatibility between data systems seeking to synchronize events can cause an incomplete synchronization of information between systems.

Figure 4:
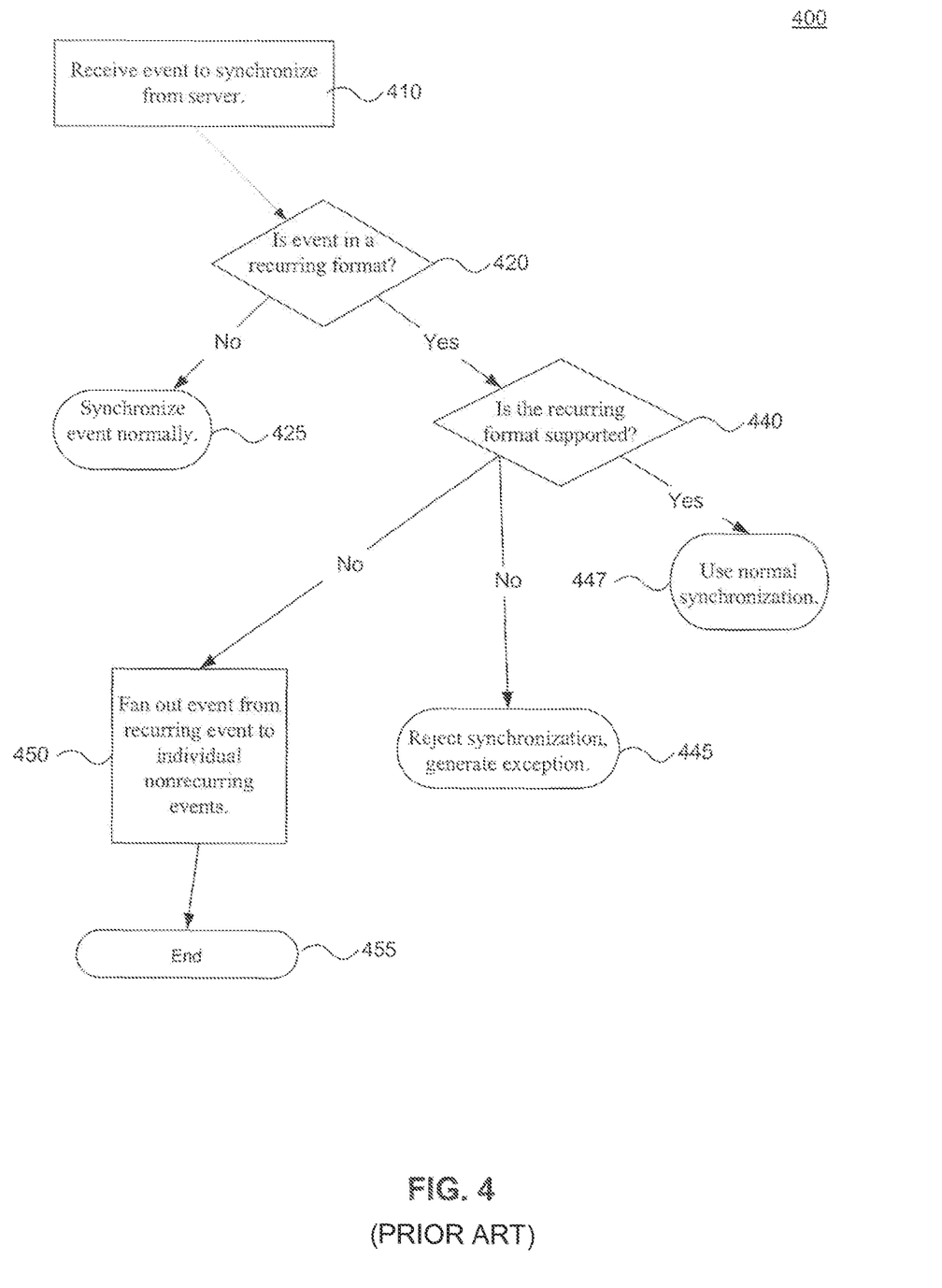
FIG. 4 is a flowchart illustrating the operation of traditional synchronization techniques.

FIG. 4 depicts a flowchart showing conventional solutions to resolving compatibility issues with recurring events. In step 410, mobile device 102 receives an event to synchronize from calendar server 206. In step 420, a determination is made of whether the event is in a recurring format, and if it is not, a normal synchronization takes place. If the event is determined by step 420 to be in a recurring format, then a second determination in step 440 is made as to whether the recurring format is supported on mobile device 102. If the format is supported on mobile device 102 then step 447 conducts a normal synchronization.

If, however, the recurring format from calendar server 206 is not supported on mobile device 102 then different approaches are traditionally taken. A first approach, step 445, involves the rejection, by mobile device 102 of the recurring event. An exception may then be generated and stored in a log for review.

A second approach to unsupported recurring event format synchronization involves in step 450 "fanning out," the individual occurrences of the recurring event into individual events in the mobile device 102 calendar. Thus, the event 318 with exception 319 shown on week calendar 310 would be fanned out to individual appointments 332-334 and 336 on the mobile device 102.

The fanning out approach used in step 450 may have several negative implications for user experience. Typically, when a user seeks to change a recurring appointment, an option is offered by the user interface, to change either the occurrence of the event, or the entire defined event. Thus a user who seeks to change an event occurring "every Wednesday, from 1 PM-3 PM, until Apr. 29, 2010" will be allowed to either change the entire recurring appointment to 3 PM-4 PM for instance, or only change a single day of the event. The former change will change the pattern 341 of the recurring appointment, while the latter change will create an exception for the single day selected. In the alternative, with respect to the above example, a user may want to omit a particular Wednesday during the period from the recurring event. In that situation, a deleted exception is created, omitting the specific day.

However, in implementations of the traditional fanning out approach of step 450 shown on FIG. 4, because the recurring event has been fanned out, changing any one of the individual fanned out events typically does not allow for a change of the entire recurring event. This is the case because, unlike the original single, recurring event from server 106, the fanned out events generated by step 450 are not linked together on mobile device 102.

Synchronization of Incompatible Recurring Events

Figure 5:
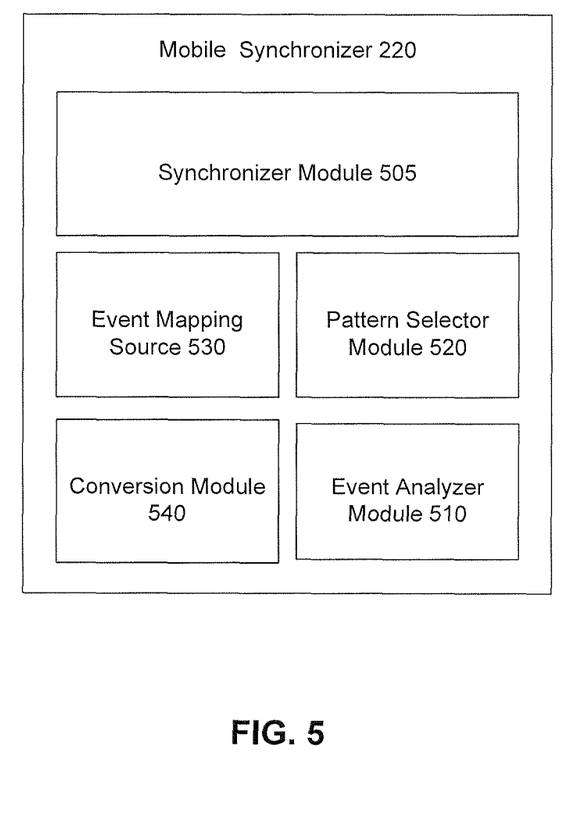
FIG. 5 depicts a mobile synchronizer according to an embodiment of the invention.

FIG. 5 displays mobile synchronizer 220, including a synchronizer module 505, an event analyzer module 510, a pattern selector module 520, a conversion module 540 and an event mapping source 530, according to an embodiment of the invention. As shown on FIG. 2, in embodiments mobile synchronizer 220 is installed on mobile device 102, and by linking with server synchronizer 225, supports the synchronization of data objects between server calendar application 215 and mobile calendar application 210. Both mobile synchronizer 220 and mobile calendar application 210 are example applications that are designed to be executed on a mobile device, such as mobile device 102, but the embodiments and logic of these applications apply to other, non-mobile embodiments, such as the personal computers or servers described with respect to FIG. 11 herein.

Figure 6A:
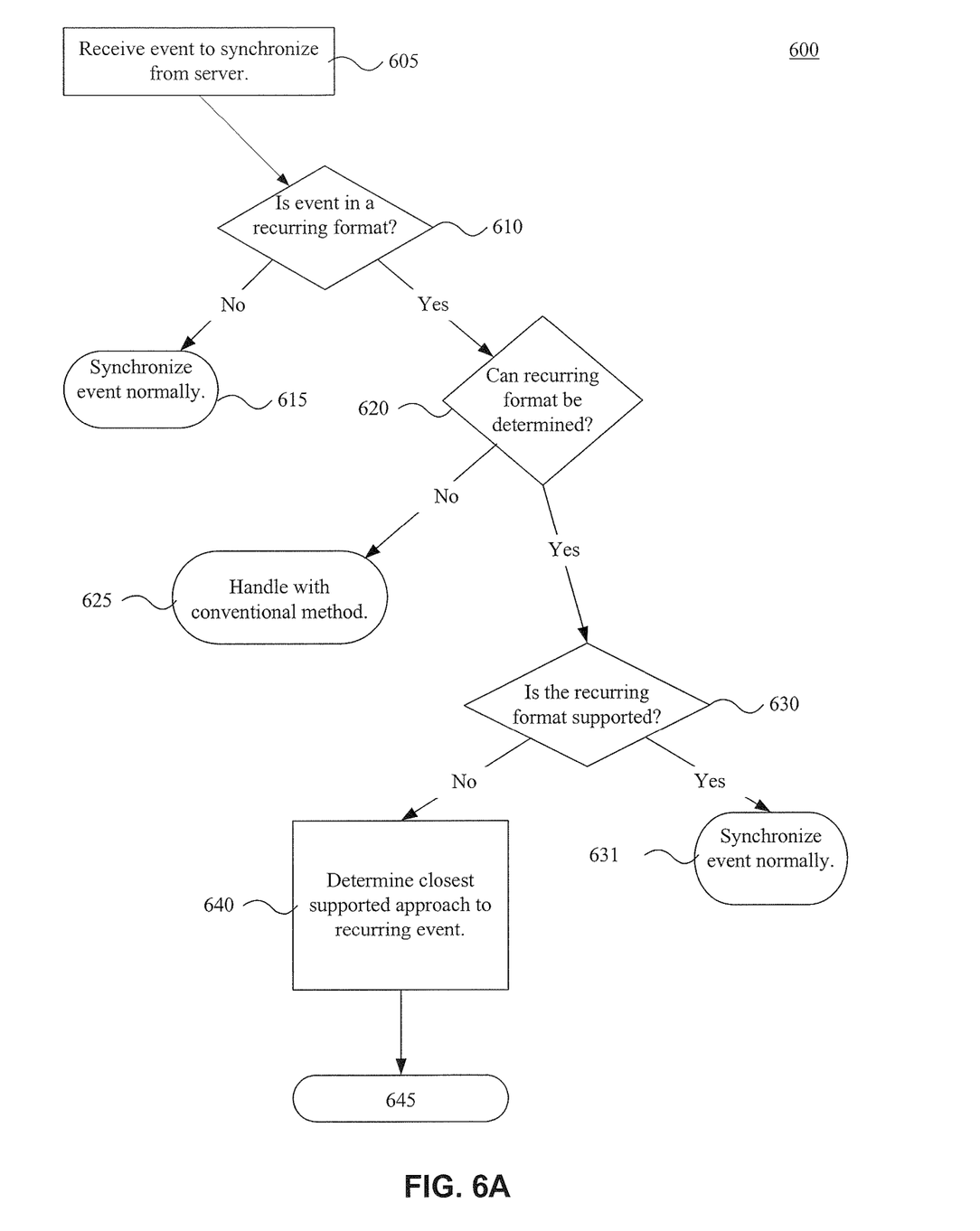
FIGS. 6A-B are connected flowcharts illustrating the operation of a process of synchronizing recurring time-scheduled data objects between incompatible databases according to an embodiment of the invention.
Figure 6B:
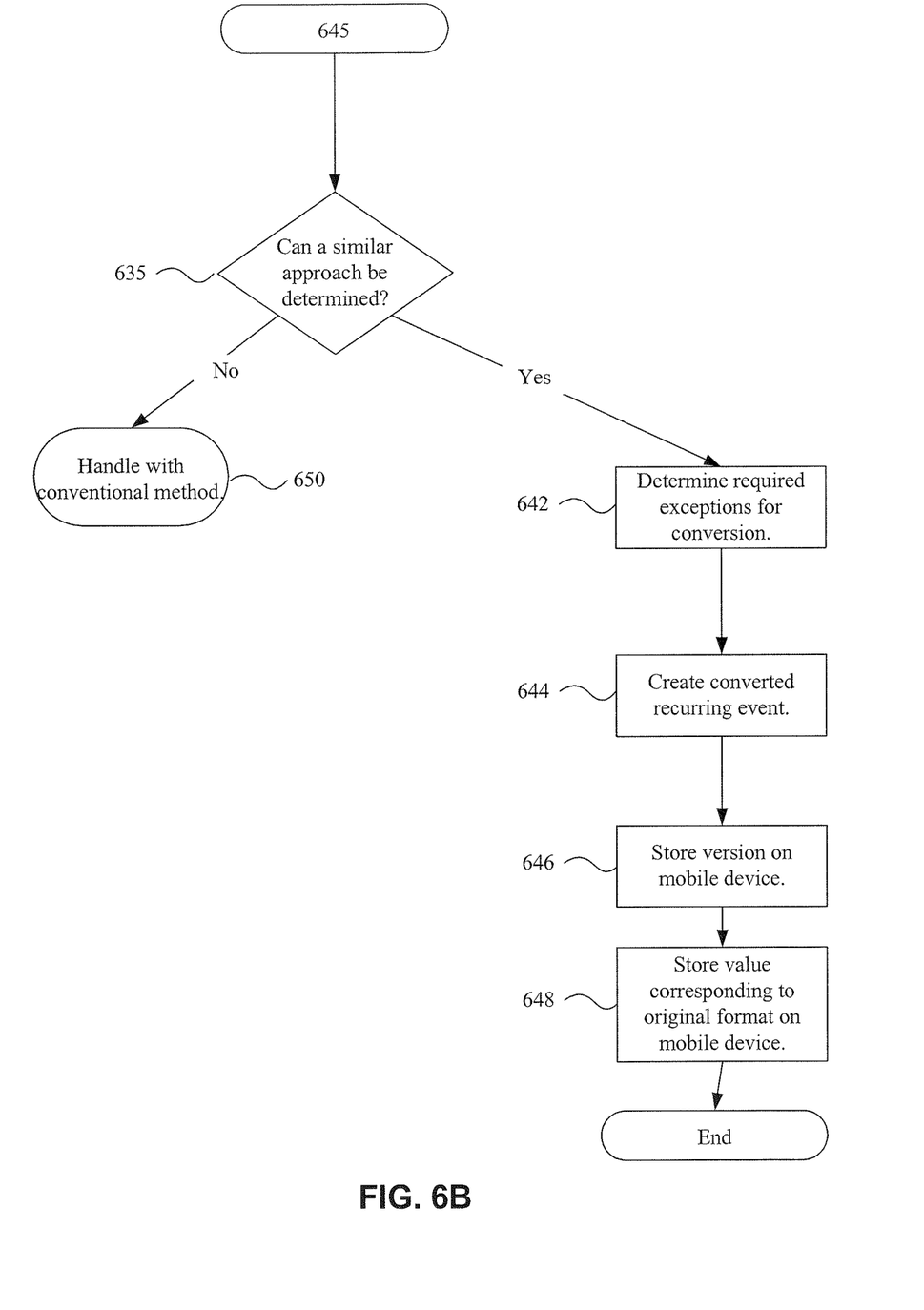

As shown in FIGS. 6A and 6B, flowchart 600 depicts embodiments of mobile synchronizer 220, specifically, how mobile synchronizer 220 enables the synchronization of recurring events that are supported by server calendar application 215, but not supported by mobile calendar application 210.

In step 605, an event is received from a transmitting device running a calendaring application at a device that is also running a calendaring application, where the calendar stores on both devices are to be synchronized. For the purposes of this example, a recurring event includes, as discussed above, a bounded event pattern that defines recurrence, along with exceptions to the pattern. In embodiments, the transmitting device is calendar server 206 and the receiving device is mobile device 102. In embodiments, Mobile synchronizer 220 is running on mobile device 102 and receives the event from server synchronizer 225 for further processing.

In step 610, the received event is analyzed to determine whether it is a recurring event. In embodiments, the event is analyzed by event analyzer module 510 and if it is not a recurring event, synchronization proceeds, using synchronizer module 505, according to conventional approaches in step 615. If the event is a recurring event, the process proceeds to step 620.

In step 620, the recurring event is analyzed to determine which recurring format it uses. For the purposes of this example, the recurring format includes the bounded pattern and any exceptions. Each part of the recurring event—boundaries, recurrence pattern and exceptions (both deleted exceptions and modified exceptions)—will have a specific format. In an embodiment, event analyzer module 510 performs the determination of the event format. To make the event format determination easier in an embodiment, the event is encoded with an identifier that identifies the specific type of recurring event. Event mapping source 530 can, in embodiments, provide a reference to identify recurring formats for event analyzer module 510 according to this identifier. In another embodiment, event analyzer module 510 may determine by the event type by parsing and analyzing the event format according to known or understandable formats.

In an embodiment, if the format cannot be determined, then the process proceeds to step 625, where the traditional approaches of steps 450 or 445 described above may be used to receive and process the unknown recurring event.

In step 630, the identified recurring event format is analyzed to determine whether it is supported by the receiving device, for example mobile calendar application 210. All parts of the recurring event—boundaries, pattern and exceptions—must all be supported. In an embodiment, event analyzer module 510 determines whether mobile calendar application 210 supports the identified recurring format. If the mobile calendar application 210 supports the identified recurring format, then synchronization proceeds according to conventional methods in step 635, using synchronizer module 505. If the identified recurring format is not supported by mobile calendar application 210, then logic proceeds to step 640.

In an embodiment, event mapping source 530 can perform this support determination, by using the attached identifier described above. For example, if the received event is encoded as an event of format A1, and format A1 can be found in event mapping source 530 as either a supported or an unsupported recurring event, then the determination can be quickly accomplished.

In step 631, if the step 630 determines that the recurring event is supported on the system then, in an embodiment, synchronization can proceed normally using synchronizer module 505.

In step 640, the most similar supported recurring format on mobile calendar application 210 to the identified recurring format from the transmitting device is selected. In an embodiment, this function is performed by pattern selector module 520 consulting event mapping source 530 that contains a list of unsupported formats, along with their most similar supported equivalent. For example, event format A1 discussed above, may have a listing in event mapping source 530 that specifies that event format B1 is the most similar supported format on mobile calendar application 210. This list may be updated as new formats are developed or existing formats are added or modified. Those with skill in the art will recognize that other approaches to determining the most similar event format may be used. In another embodiment, event analyzer pattern selector module 520 may determine the most similar supported recurring format by parsing and analyzing the event format according to known or understandable formats.

In step 635, if a similar approach cannot be determined, in step 650, a conventional method may be used to handle the synchronization of the recurring record, e.g., fanning out or rejecting the record as discussed above with FIG. 4.

In step 635, if a similar supported format can be determined, then at step 642 the exceptions required are determined to match the original unsupported format. In an embodiment, a conversion is performed by conversion module 540, where the original unsupported format event is converted into an event in the most similar supported format. In performing this conversion, a combination of the components of a recurring event discussed above (pattern, bounds, exceptions, etc.) may be combined to achieve the compatibility. For example, an event format pattern supported on the receiving device can be overlayed with deleted exceptions that convert the supported pattern into the functional equivalent of the supported pattern.

In an embodiment, the exceptions required to convert the original unsupported format to the supported format are stored in event mapping source 530 and are supplied to conversion module 540 at step 642 to perform the conversion.

The following examples E1-E4 illustrate this format selection and conversion process:

E1. If the event to be synchronized occurs "every weekday" and mobile calendar application 210 supports a "daily recurring event" but not an "weekday recurring event" pattern, as discussed above, a supported format may be selected that uses exceptions supported in mobile calendar application 210. In this example, if mobile calendar application 210 supports an "daily recurring record" pattern and single day deleted exceptions, then the "weekday recurring event" pattern from the server can be imported by treating the pattern as "daily recurring except Saturday and Sunday." Using this technique, the weekday pattern with no exceptions on one source can be converted by selecting the closest supported pattern—every day—and applying deleted exceptions for weekends.

E2. If the event to be synchronized occurs "every other day" and mobile calendar application 210 supports an "daily recurring event" but not an "every other day recurring event" pattern, a converted event may be created by selecting "daily recurring" as the closest supported format, and applying deleted exceptions for the skipped days when the event does not occur.

E3. If the event to be synchronized occurs every other week on a particular day, and mobile calendar application 210 supports a "weekly recurring event" but not an "every other week recurring" event, a weekly recurring event is created on the mobile device, with deleted exceptions applied for the weeks where the event does not occur. For example, an event that occurs "every other week, Monday" could be synchronized with embodiments described herein as "every week, Monday," with deleted exceptions applied on Monday for the weeks that do not have the event scheduled.

E4. If the event to be synchronized occurs on the second Monday every month, and the mobile device does not support this "monthly by day, nth occurrences, repeated" pattern, but does support an "every week, by day" pattern, then a weekly event on a particular day is created on the mobile device, with exceptions for all the weeks of the month where the event does not occur, e.g., "every Monday, with an exception for the first, third and fourth Monday of the month." Embodiments of conversion module 540 can perform these types of counting determinations when applying exceptions in the conversion process.

Examples E1-E4 above are illustrative and not intended to limit the invention. As would be apparent to a person skilled in the art given this description, other approaches could be taken to select a similar supported formats and perform a similar conversion process.

In step 644, in an embodiment, a supported recurring event is created based on the conversion described above, and stored in step 646 in mobile calendar application 210. In embodiments of the present invention, this conversion and use of formats existing on a receiving device when receiving unsupported synchronized events results in a better user experience when using the events. As discussed above, storing a recurring event in a recalling format provides benefits to the user experience in the form of additional commands, ease of modification and storage size of the event. Embodiments discussed herein increase the likelihood that a useful supported recurring function on a remote device is used, rather than a conventional fanned out single event version.

In step 648, an embodiment stores an indication of the original unsupported format along with the converted event. This original format will be available if required for further transfer. In an embodiment, the original format can be transmitted along with the supported recurring event back to calendar server 206. This format can be used by logic in the calendar server 206 to receive the supported (on the mobile device) recurring event.

Figure 7:
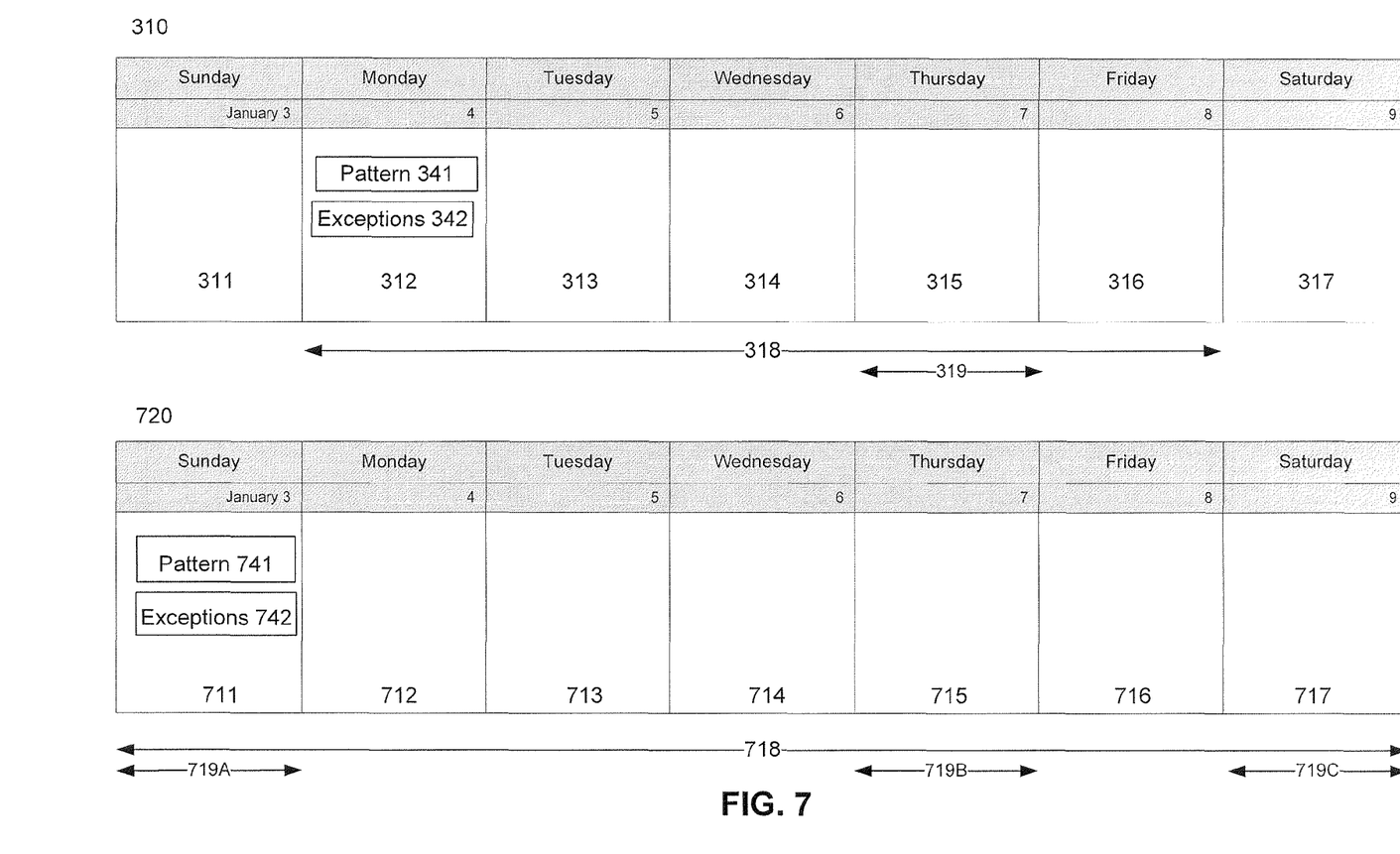
FIG. 7 depicts example calendars according to an embodiment of the invention.

FIG. 7 shows an example conversion between a recurring appointment scheduled on calendar 310 and a recurring appointment scheduled on calendar 720. In this example, calendar 310 represents a calendar stored on a first calendaring application, for example server calendar application 215 from FIG. 2, and calendar 720 represents a calendar stored on a second calendaring application, for example mobile calendar application 210 from FIG. 2. Example calendar 310 supports events occurring every weekday, with single day deleted exceptions, and calendar 720 does not support this pattern, but does support full week events with single day deleted exceptions.

The event scheduled on both calendars 310 and 720 is a full-day event scheduled to occur every weekday, except Thursday, for an unlimited time period. On calendar 310, this event is stored on Monday day 312, with pattern 341 and exceptions 342 defining the recurring event. Event 318 encompasses days 312-316, and exception 319 shows a single deleted exception for Thursday 315. This event either continues on indefinitely, or ends from some limit defined by the server calendar application 215 calendaring application.

In this example, this event is synchronized, using an embodiment of the present invention, with mobile calendar application 210. As with the function described in step 640 above, the "daily recurring event" 718 is selected by pattern selector module 520 in mobile calendar application 210 as the most similar supported recurring format from the list contained in event mapping source 530. In an embodiment, the conversion module 540 then selects three deleted exceptions—Sunday 719A, Thursday 719B and Saturday 719C.

Method 800

Figure 8:
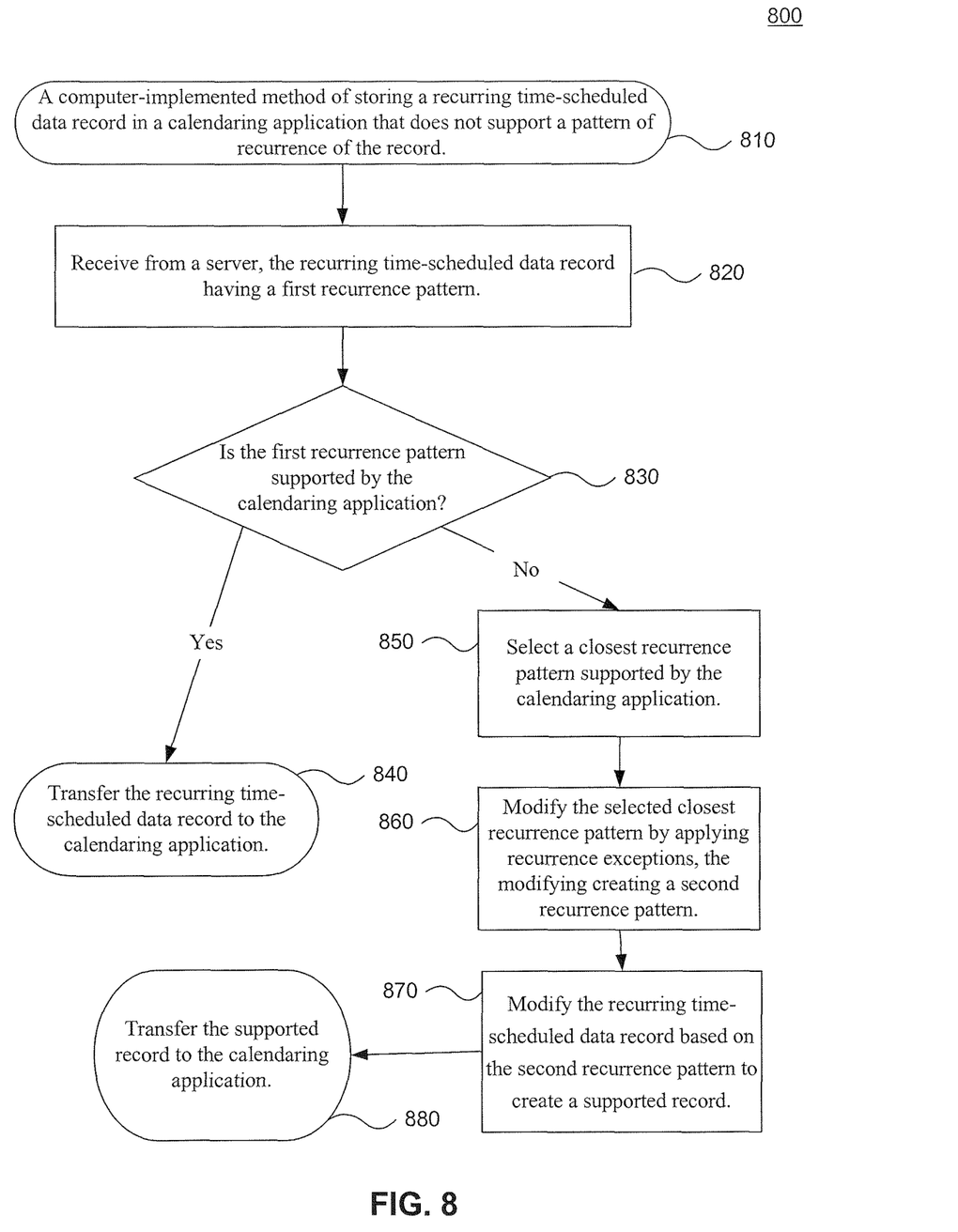
FIG. 8 is a flowchart illustrating a method of storing a recurring time-scheduled data record in a calendaring application that does not support a pattern of recurrence of the record according to an embodiment of the invention.

This section and FIG. 8 summarize the techniques described herein by presenting a flowchart of an exemplary method 800 for storing a recurring time-scheduled data record in a calendaring application that does not support a pattern of recurrence of the record. While method 800 is described with respect to an embodiment of the present invention, method 800 is not meant to be limiting and may be used in other applications.

As shown in FIG. 8, an embodiment of method 800 begins at step 820 where a recalling time-scheduled data record having a first recurrence pattern is received from a server. In an embodiment, a server, such as calendar server 206 is the source of a recurring time-scheduled data record, such as the recurring event shown on calendar 320 from FIG. 3. Once step 820 is complete, method 800 proceeds to step 830.

At step 830, a determination is made as to whether the first recurrence pattern is supported by the calendaring application. In an embodiment, a calendaring application is referenced, such as mobile calendar application 210 of FIG. 2. If the pattern is not supported, then method 800 continues to step 850.

At step 850, a closest recurrence pattern supported by the calendaring application is selected, and at step 860, the selected pattern is modified to creating a second recurrence pattern by applying recurrence exceptions. Once step 860 is complete, then method 800 continues to step 870.

At step 870, the recurring time-scheduled data record is modified based on the second recurrence pattern to create a supported record, and in step 880, the supported record is transferred to the calendaring application. Once step 860 is complete, method 800 ends.

If, at step 830, a determination is made that the first recurrence pattern is supported by the calendaring application, then method 800 continues to step 840, where the supported record is transferred to the calendaring application.

Steps 810, 820, 830, 840, 850, 860, 870 and 880 may be implemented as software, hardware, firmware, or any combination.

Example Computer Embodiment

Figure 9:
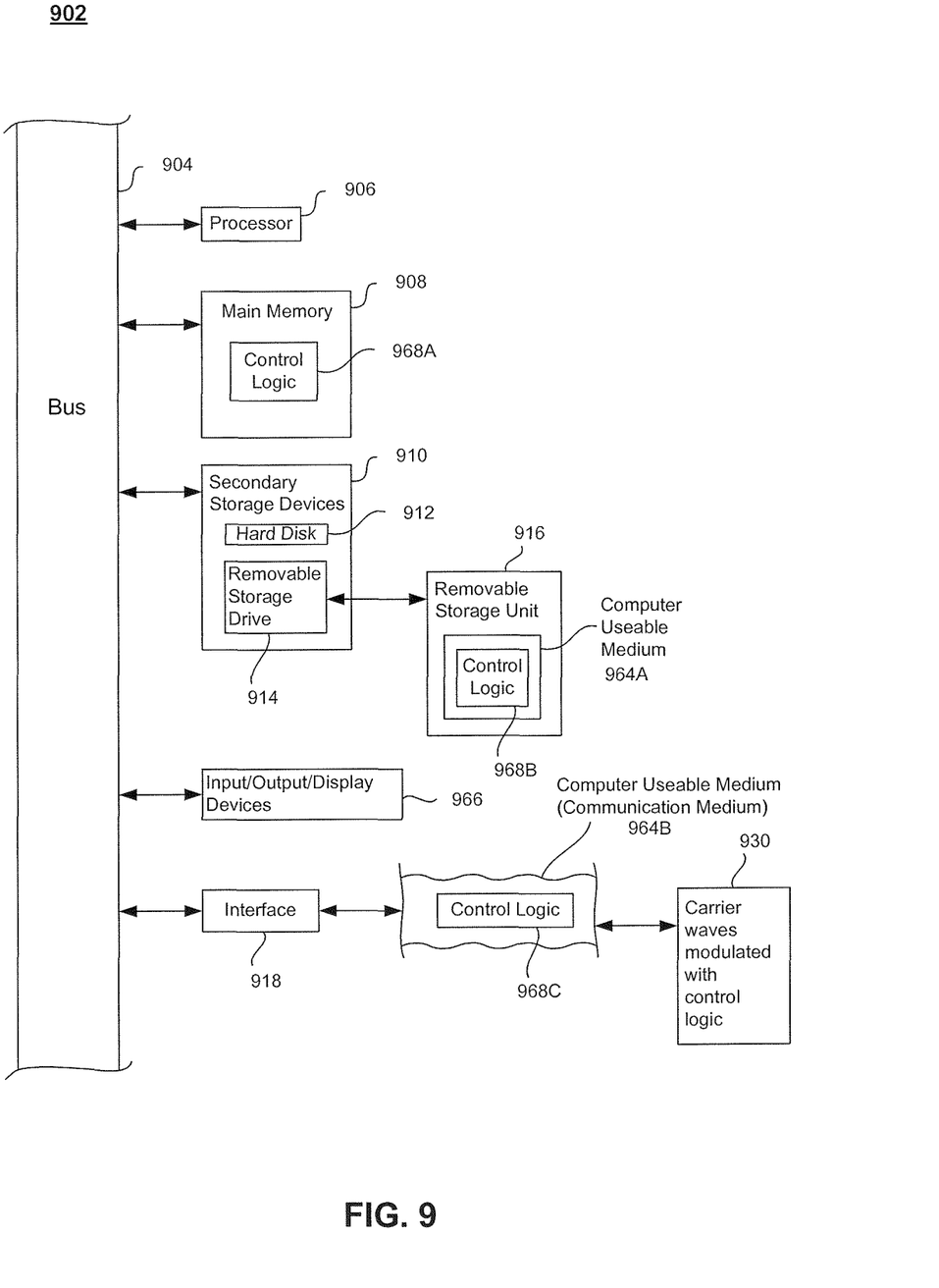
FIG. 9 illustrates an example computer system, useful for implementing components of embodiments of the invention.

In an embodiment of the present invention, the system and components of embodiments described herein are implemented using well known computers, such as computer 902 shown in FIG. 9. For example, mobile device 102, servers 106, 206 and the operation of flowcharts in FIGS. 6A-B and 8 described above, can be implemented using computer(s) 902. Computer 902 includes mobile devices or other mobile processing system components as described in relation to FIG. 1.

Computer 902 can be any commercially available and well known computer capable of performing the functions described herein, such as computers available from International Business Machines, Apple, Sun, HP, Dell, Compaq, Digital, Cray, etc.

The computer 902 includes one or more processors (also called central processing units, or CPUs), such as a processor 906. The processor 906 is connected to a communication bus 904.

The computer 902 also includes a main or primary memory 908, such as random access memory (RAM). The primary memory 908 has stored therein control logic 928A (computer software), and data.

The computer 902 also includes one or more secondary storage devices 910. The secondary storage devices 910 include, for example, a hard disk drive 912 and/or a removable storage device or drive 914, as well as other types of storage devices, such as memory cards and memory sticks. The removable storage drive 914 represents a floppy disk drive, a magnetic tape drive, a compact disk drive, an optical storage device, tape backup, etc.

The removable storage drive 914 interacts with a removable storage unit 916. The removable storage unit 916 includes a computer useable or readable storage medium 924 having stored therein computer software 928B (control logic) and/or data. Removable storage unit 916 represents a floppy disk, magnetic tape, compact disk, DVD, optical storage disk, or any other computer data storage device. The removable storage drive 914 reads from and/or writes to the removable storage unit 916 in a well known manner.

The computer 902 also includes input/output/display devices 922, such as monitors, keyboards, pointing devices, etc.

The computer 902 further includes a communication or network interface 918. The network interface 918 enables the computer 902 to communicate with remote devices. For example, the network interface 918 allows the computer 902 to communicate over communication networks or mediums 924B (representing a form of a computer useable or readable medium), such as LANs, WANs, the Internet, etc. The network interface 918 may interface with remote sites or networks via wired or wireless connections.

Control logic 928C may be transmitted to and from the computer 902 via the communication medium 924B. More particularly, the computer 902 may receive and transmit carrier waves (electromagnetic signals) modulated with control logic 930 via the communication medium 924B.

Any apparatus or manufacture comprising a computer useable or readable medium having control logic (software) stored therein is referred to herein as a computer program product or program storage device. This includes, but is not limited to, the computer 902, the main memory 908, secondary storage devices 910, the removable storage unit 916 and the carrier waves modulated with control logic 930. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method of storing a recurring time-scheduled data record in a calendaring application that does not support a pattern of recurrence of the record, comprising:
   receiving, from a first calendaring application on a server, a first recurring time-scheduled data record having a first recurrence pattern;
   determining that the first recurrence pattern is not supported by a second calendaring application operating on a mobile device;
   selecting a closet recurrence pattern supported by the second calendaring application;
   modifying the selected closest recurrence pattern by applying recurrence exceptions, the modifying creating a second recurrence pattern;
   modifying the first recurring time-scheduled data record based on the second recurrence pattern to create a second recurring time-scheduled data record;
   transferring the second recurring time-scheduled data record to the second calendaring application; and
   storing the first recurrence pattern on the mobile device.

2. The computer-implemented method of claim 1, further comprising synchronizing the first and second recurring time-scheduled data records using the stored first recurrence pattern.

3. The computer-implemented method of claim 1, wherein selecting the closest recurrence pattern supported by the second calendaring application is based on a list mapping recurrence patterns unsupported by the second calendaring application to recurrence patterns supported by the second calendaring application.

4. The computer-implemented method of claim 1 wherein, selecting a closest recurrence pattern comprises selecting a recurrence pattern wherein the time-scheduled data record occurs every day; and
   wherein modifying the selected closest recurrence pattern comprises modifying the selected closest recurrence pattern by applying daily exceptions.

5. The computer-implemented method of claim 4, wherein the applying daily exceptions comprises applying daily exceptions for each day not included in the first recurrence pattern.

6. The computer-implemented method of claim 1, wherein selecting a closest recurrence pattern comprises selecting a recurrence pattern wherein the time-scheduled data record occurs on at least one-named day every week; and
   wherein, modifying the selected closest recurrence pattern comprises modifying the selected closest recurrence pattern by applying daily exceptions for each day not included in the first recurrence pattern.

7. The computer-implemented method of claim 1 wherein selecting a closest recurrence pattern comprises selecting a recurrence pattern wherein the time-scheduled data record occurs on at least one numbered day every month; and
   wherein modifying the selected closest recurrence pattern comprises modifying the selected closest recurrence pattern by applying daily exceptions for each day not included in the first recurrence pattern.

8. A computer-implemented synchronizer for adapting a recurring time-scheduled data record for an application that does not support a pattern of recurrence of the record, comprising:

an event analyzer module configured to receive a first recurring time-scheduled data record from a first calendaring application on a server, wherein the event analyzer determines that the received first recurring time-scheduled data record has a recurrence pattern that is unsupported by a second calendaring application operating on a mobile device;

a pattern selector module configured to, upon a determination by the event analyzer that the received data record has a first recurrence pattern that is unsupported by the second calendaring application, select a recurrence pattern supported by the second calendaring application that is similar to the recurrence pattern of the received data record;

a conversion module configured to apply exceptions to the selected supported recurrence pattern, and convert the received first recurring time-scheduled data record into a second recurring time-scheduled data record having the selected supported recurrence pattern;

a synchronizer module configured to transfer the second recurring time-scheduled data record to the second calendaring application; and storing the first recurrence pattern on the mobile device.

9. The computer implemented synchronizer of claim 8, wherein the synchronizer module is further configured to synchronize the first and second recurring time-scheduled data records using the stored first recurrence pattern.

10. The computer implemented synchronizer of claim 8, wherein the pattern selector module is configured to select the closest recurrence pattern based on a list mapping recurrence patterns unsupported by the second calendaring application to recurrence patterns supported by the second calendaring application.

11. The computer-implemented synchronizer of claim 8, further comprising:
a pattern mapping source configured to provide
the list to the event analyzer.

12. A computer-readable storage device having computer-executable instructions stored thereon that, if executed by a computing device, cause the computing device to perform a method comprising:

receiving from a first calendaring application on a server, a first recurring time-scheduled data record having a first recurrence pattern;

determining that the first recurrence pattern is not supported by a second calendaring application operating on a mobile device;

selecting a closest recurrence pattern supported by the second calendaring application;

modifying the selected closest recurrence pattern by applying recurrence exceptions, the modifying creating a second recurrence pattern;

modifying the first recurring time-scheduled data record based on the second recurrence pattern to create a second recurring time-scheduled data record;

transferring the second recurring time-scheduled data record to the second calendaring application; and storing the first recurrence pattern on the mobile device.

13. A computer-implemented method of synchronizing recurring time-scheduled data records, comprising:

storing at a first calendaring application, a first recurring time-scheduled data record having a first recurrence pattern;

selecting a closest recurrence pattern supported by a second calendaring application, the second calendaring application operated on a mobile device, wherein the selecting is based on a list mapping recurrence patterns unsupported by the second calendaring application to recurrence patterns supported by the second calendaring application;

storing the second recurring time-scheduled data record in the second calendaring application using the closest recurrence pattern and recurrence exceptions;

storing the first recurrence pattern on the mobile device;

receiving a request to synchronize the first and second recurring time-scheduled data records;

receiving the stored first recurrence pattern from the mobile device; and synchronizing the first and second recurring time-scheduled data records using the stored first recurrence pattern.

14. The computer-implemented synchronizer of claim 8, wherein the pattern selector module is configured to select a closest recurrence pattern where the time-scheduled data record occurs every day, and the conversion module is configured to convert the selected closest recurrence pattern by applying daily exceptions.

15. The computer-implemented synchronizer of claim 14, wherein the conversion module is configured to convert the selected closest recurrence pattern by applying daily exceptions for each day not included in the selected closest recurrence pattern.

16. The computer-implemented synchronizer of claim 8, wherein the pattern selector module is configured to select a closest recurrence pattern where the time-scheduled data record occurs on at least one-named day every week, and the conversion module is configured to convert the selected closest recurrence pattern by applying daily exceptions for each day not included in the selected closest recurrence pattern.

17. The computer-readable storage device of claim 12, wherein the instructions stored thereon further comprise an instruction synchronizing the first and second recurring time-scheduled data records using the stored first recurrence pattern.

18. The computer-readable storage device of claim 12, wherein selecting the closest recurrence pattern supported by the second calendaring application is based on a list mapping recurrence patterns unsupported by the second calendaring application to recurrence patterns supported by the second calendaring application.

19. The computer-readable storage device of claim 12, wherein selecting a closest recurrence pattern comprises selecting a recurrence pattern wherein the time-scheduled data record occurs every day, and wherein modifying the selected closest recurrence pattern comprises modifying the selected closest recurrence pattern by applying daily exceptions.

* * * * *